United States Patent [19]

Pyle

[11] Patent Number: 4,576,076

[45] Date of Patent: Mar. 18, 1986

[54] MULTIPLE INTERSECTING PLANES CUTTING DEVICE

[75] Inventor: Stoddard H. Pyle, Corvallis, Oreg.

[73] Assignee: Speed Cut, Inc., Corvallis, Oreg.

[21] Appl. No.: 661,392

[22] Filed: Oct. 16, 1984

[51] Int. Cl.$^4$ ................................................ B27B 5/20
[52] U.S. Cl. .................... 83/471.3; 83/486.1; 83/488; 83/581; 83/522
[58] Field of Search ............... 83/471.3, 486.5, 488, 83/581, 522

[56] References Cited

U.S. PATENT DOCUMENTS

| | | | |
|---|---|---|---|
| 4,152,961 | 5/1979 | Batson | 83/471.3 |
| 4,211,134 | 7/1980 | Thorsell et al. | 83/471.3 |
| 4,452,117 | 6/1984 | Brickner et al. | 83/581 |

Primary Examiner—Donald R. Schran
Attorney, Agent, or Firm—Kimmel, Crowell & Weaver

[57] ABSTRACT

A production machine for cutting components for furniture, house framing and framing for concrete construction is disclosed. A powered cutting blade can traverse a linear horizontal path above the support surface of a workpiece horizontal table. The blade can be moved upwardly and downwardly vertically relative to the support surface of the table, can be shifted horizontally on a second linear path across the axis of the first-named linear path, can be rotated around a vertical axis, and can be tilted in two directions around a horizontal pivot axis below and parallel to the first-named linear path. The arrangement enables cutting of components in multiple intersecting planes.

18 Claims, 9 Drawing Figures

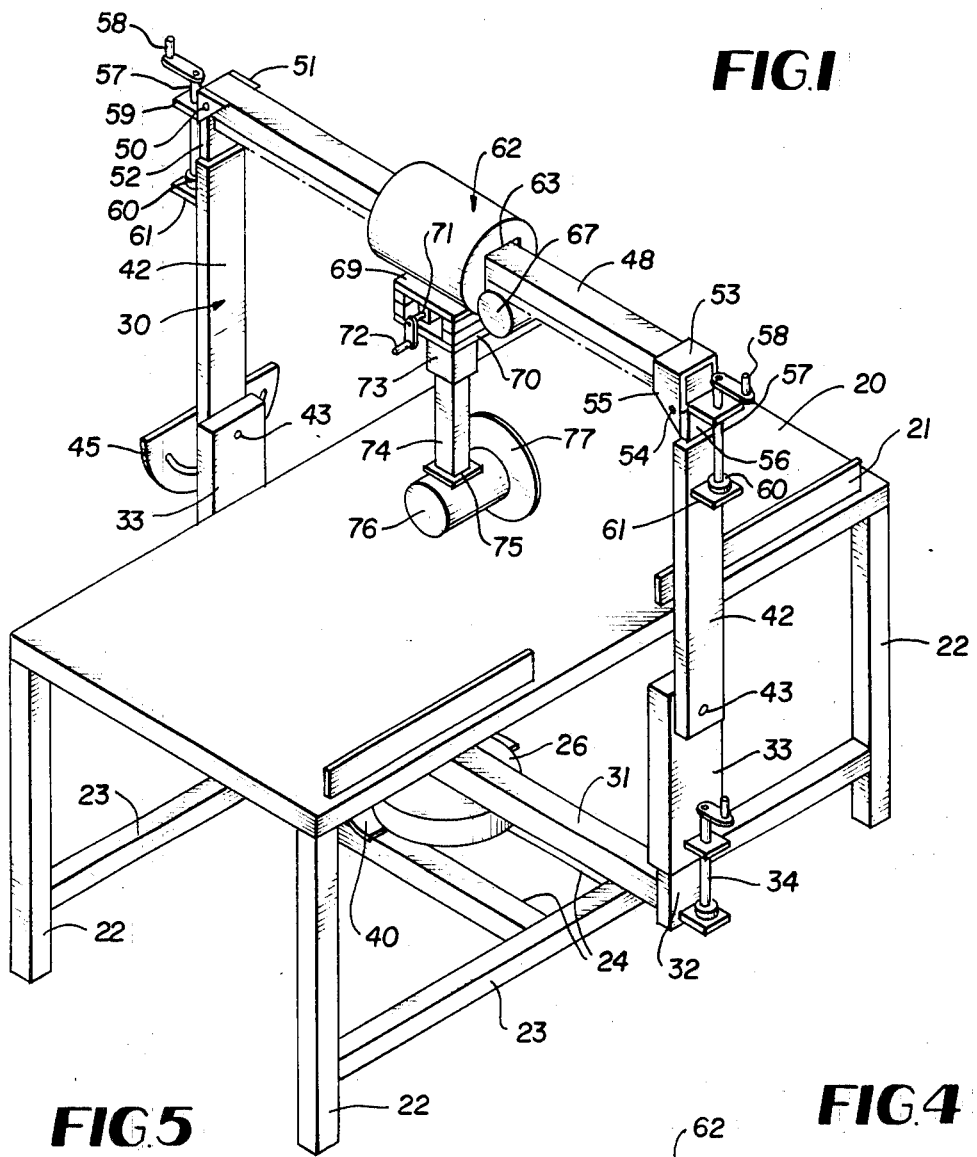
FIG.1
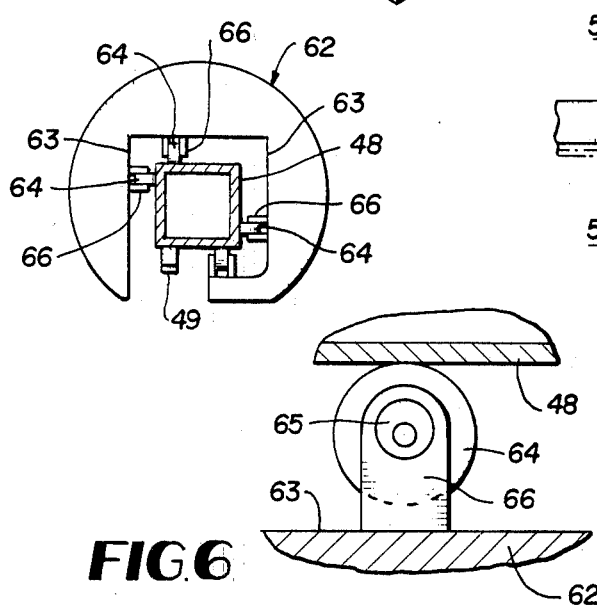
FIG.5
FIG.4
FIG.6

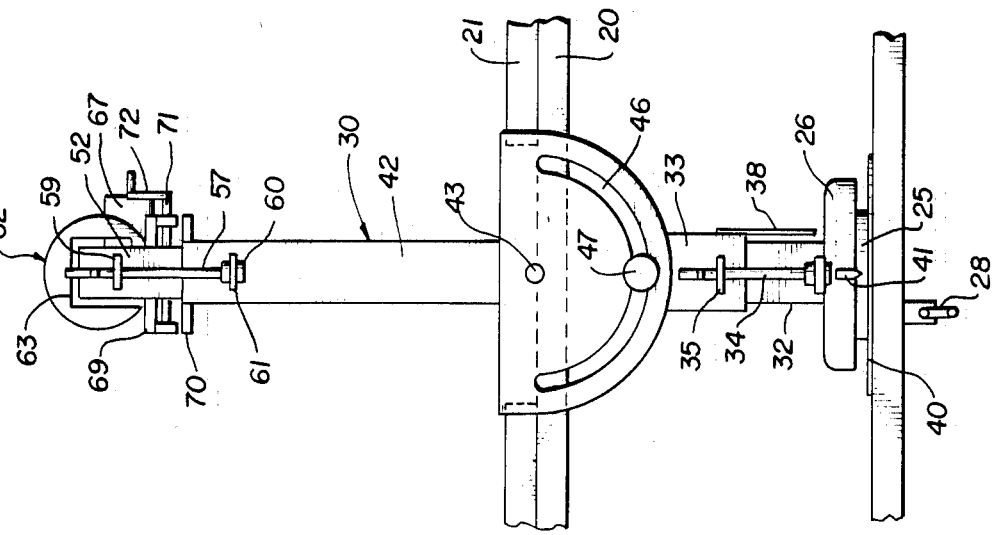
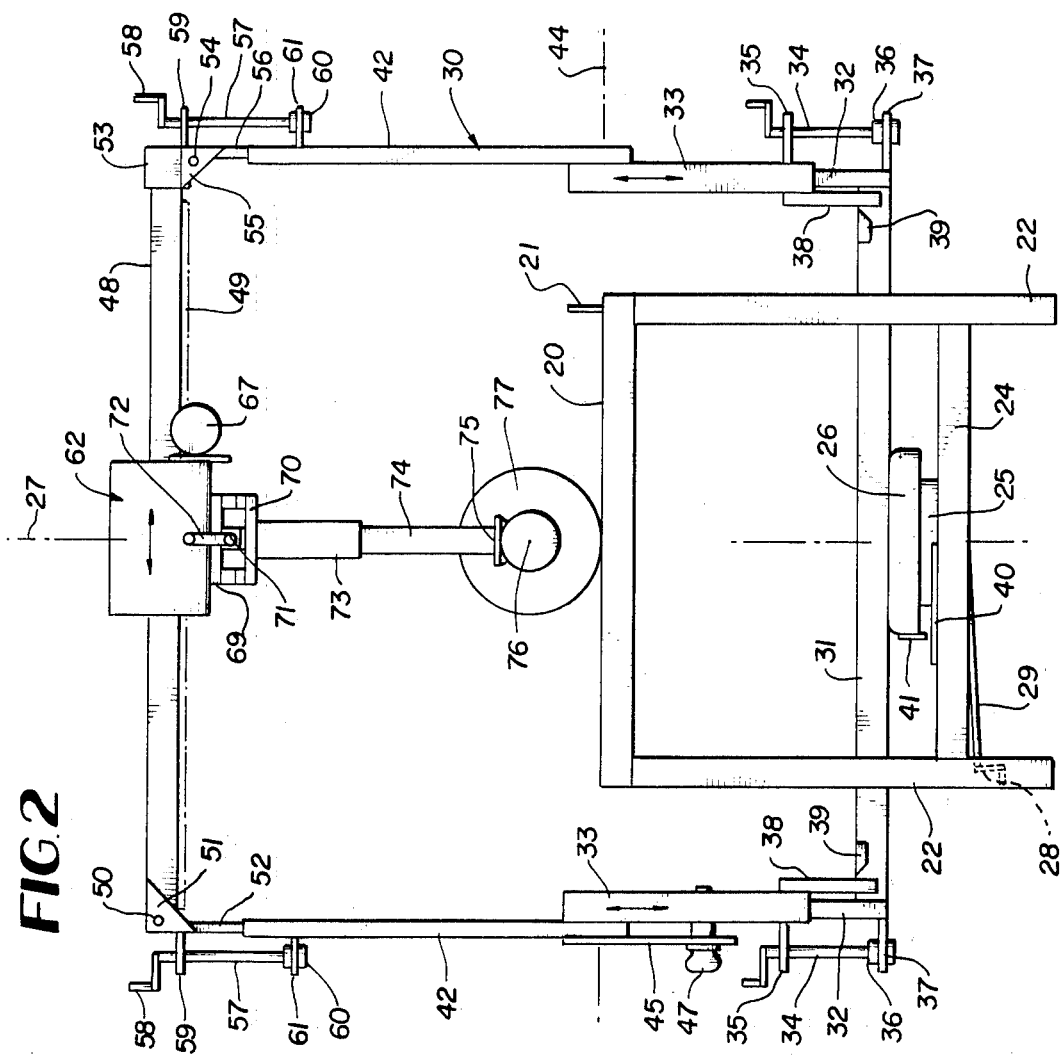

MULTIPLE INTERSECTING PLANES CUTTING DEVICE

BACKGROUND OF THE INVENTION

Components used in the construction of furniture, house framing and the like require cutting at multiple diverse angles, both simple and compound, and cutting in multiple intersecting planes. A variety of machines are available for making the required cuts individually but heretofore no device or machine has been available for making all or most of the required cuts on a production basis at a single work station. Accordingly, the objective of the present invention is to provide a unified cutting machine which will satisfy the above need to the greatest possible extent.

A further object of the invention is to provide a multiple intersecting planes cutting device which will make precision cuts on a repetitive basis through workpieces at all required angles.

A further object is to provide a machine of the above character which possesses all of the necessary adjustments of critical parts, is comparatively simple and practical in construction, convenient to operate, sturdy and highly versatile in its operational capabilities.

Other features and advantages of the invention will become apparent to those skilled in the art during the course of the following detailed description.

BRIEF DESCRIPTION OF THE DRAWING FIGURES

FIG. 1 is a perspective view of a multiple intersecting planes cutting machine according to one embodiment of the present invention.

FIG. 2 is a side elevational view of the machine in FIG. 1.

FIG. 3 is a fragmentary side elevation of the machine viewed from the left-hand side of FIG. 2.

FIG. 4 is an enlarged fragmentary side elevation of a carriage and associated components.

FIG. 5 is a vertical section taken on line 5—5 of FIG. 4.

FIG. 6 is a fragmentary horizontal section showing an adjustable carriage guide roller.

DETAILED DESCRIPTION

Figure 7:
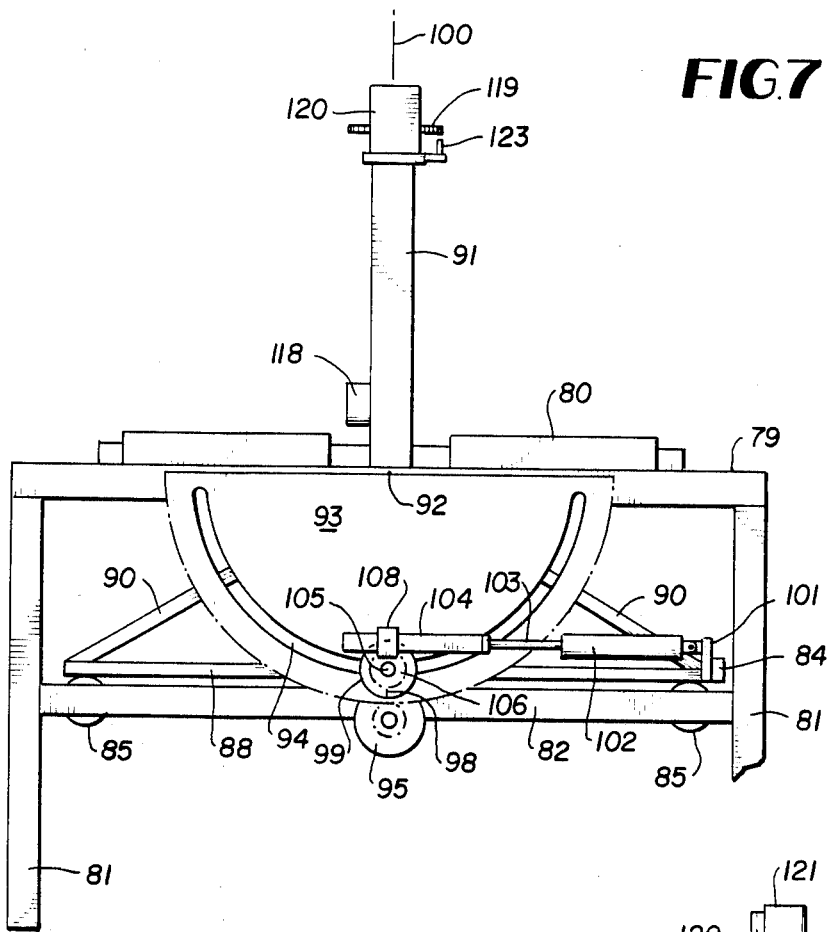
FIG. 7 is a side elevation showing a second embodiment of the invention.

Referring to the drawings in detail wherein like numerals designate like parts, a horizontal work table 20 has a workpiece fence 21 rising vertically therefrom near one longitudinal edge of the table. The table 11 is supported at its corners by legs 22, interconnected near their bottoms by a pair of horizontal frame bars 23, such bars being rigidly interconnected near their longitudinal centers by a pair of spaced parallel horizontal frame bars 24.

A short vertical spindle 25 is fixed to the frame bars 24 and rises therefrom, and a turntable 26 is rotatably mounted on the spindle 25 at a relatively low elevation on the table structure and revolves around a central vertical axis 27 of the machine. The turntable is driven in rotation with precision by conventional gearing, not shown, operated by a hand crank 28 and rotary shaft 29 adjacent to the frame bars 24.

A cutter blade carrying rectangular frame 30 includes a bottom horizontal beam 31 secured to the turntable 26 symmetrically to rotate therewith in either direction around the vertical axis 27. The beam 31 projects equidistantly on opposite sides of the vertical axis 27.

At its ends, the beam 31 carries upstanding vertical preferably rectangular cross section posts 32 rigid therewith, over which are engaged telescopically for upward and downward vertical movement rectangular cross section tubes 33. The vertical tubes 33 are raised and lowered with precision by pair of manually-operated vertical axis screw shafts 34 having threaded engagement with drive plates 35 attached rigidly to the tubes 33. The lower ends of screw shafts 34 have swiveled mountings at 36 support plates 37 fixed to the posts 32. Vertical height indicating scale members 38 fixed on the inner sides of tubes 33 coact with pointers 39 on the horizontal beam 31. A horizontal protractor scale 40 fixed on the horizontal bars 24 coacts with a pointer 41 carried by the turntable 26 to indicate with precision the rotational position of the frame 30 about the vertical axis 27.

The frame 30 further comprises additional vertical rectangular tube sections 42 which are pivotally attached by coaxial horizontal pivot elements 43 to the tubes 33 near their tops. The pivot elements 43 define a horizontal pivot axis 44 of the machine which may lie in the plane defined by the top face of table 20.

A vertical protractor plate 45 is fixed to one tube 42 to turn therewith about the axis 44. The protractor plate 45 has an arcuate slot 46 concentric with the axis 44. This slot receives therethrough a locking device on the adjacent tube 33 operated by a rotary locking and release knob 47.

The frame 30 further comprises a top horizontal rectangular cross section carriage mounting bar 48 having rack teeth 49 extending along its lower side. One end of the carriage mounting bar 48 is pivoted at 50 to a bracket means 51 secured to a rectangular cross section vertical plate 52 having telescopic engagement with the adjacent tube 42. The other end of carriage mounting bar 48 is received in a square sleeve element 53 having a pivotal connection at 54 with another bracket means 55, fixed to a vertical plate member 56 having telescopic engagement within the adjacent vertical tube 42.

The two plates 52 and 56 are independently vertically adjustable by manual screw shafts 57 having hand cranks 58 at their upper ends. These screw shafts have threaded engagement with drive lugs 59 fixed to the plates 52 and 56. The lower ends of vertical screw shafts 57 have swiveled connections at 60 with lugs 61 fixed to the outer sides of tubes 42 somewhat below their top ends.

A cutting blade carriage 62 has a downwardly opening passageway 63 formed therethrough, surrounding the opposite sides and top of square carriage mounting bar 48. The carriage 62 has precision guided engagement with the bar 48 by a system of top, bottom and side guide rollers 64 mounted on eccentrics 65 carried by holders 66 fixed to the walls of the cavity 63 formed in the carriage 62. By means of their eccentric mountings, the carriage guide rollers 64 are independently precision adjustable relative to the faces of the square carriage mounting bar 48 which they engage.

A drive motor 67 fixed to one end of the carriage 62 across the axis of the bar 48 operates a pinion gear 68 having driving engagement with the rack teeth 49 of carriage mounting bar 48, whereby the motor 67 can propel the carriage 62 in opposite directions along the horizontal bar 48.

A horizontal slide base 69 is fixed to the bottom of carriage 62 and moves therewith along the horizontal bar 48. An underlying slide base 70 is moved horizontally in opposite directions at right angles to the bar 48 by a horizontal axis manual screw shaft 71 having a hand crank 72.

Fixed dependingly to the movable slide base 70 is a vertical tube section 73 receiving telescopically therein another vertical tube section 74 having a fixed mounting plate 75 for the drive motor 76 of a horizontal axis high speed rotary saw blade 77 or other cutter blade. The saw blade 77 and its carrier tube section 74 are raised and lowered vertically relative to the table 20 by a suitable fluid-pressure operated cylinder unit 78, FIG. 4, within the tube section 73.

During operation of the cutting device or machine, the entire frame 30 including the bar 48, carriage 62 and cutting blade 77 can be rotated horizontally around the vertical axis 27 with the turntable 26 to vary the angle of cut of the blade 77 in a vertical plane. The blade 77 can also be swung in either direction from the vertical with the tubes 42 around the horizontal axis 44 and locked in any selected inclined angular position by the protractor locking knob 47, thus enabling a compound angle cut through a workpiece positioned against the fence 21. The carriage mounting bar 48 can also be finely adjusted vertically and leveled with precision by the two screw shafts 57. The two tubes 33 can similarly be raised and lowered vertically by the two screw shafts 34 to raise or lower the blade 77 with relation to the horizontal plane defined by the top of work table 20. The blade 77 and its carrier tubes 73 and 74 can be moved horizontally transversely of the bar 48 by operating the screw shaft means 71. Finally, the blade 77 can be rapidly raised and lowered on the axis defined by telescoping tube sections 73 and 74 by means of the cylinder 78.

When the tube section 74 is extended from the tube section 73, the saw blade 77 can be set to substantially contact the top of table 20 and the saw can be operated in a manner similar to any radial arm saw. If the tube section 74 is reciprocated by the cylinder 78 toward and away from the table top, the blade 77 functions as a plunge cut saw. By rotating the turntable 26 horizontally, different precision mitre angle are obtained without moving the workpiece, or a multiple number of mitre or compound angle cuts can be made on one workpiece with the intersection of the cutting planes occurring at the axis 27. By tilting the tubes 42 and protractor plate 45, compound cuts can be obtained on a workpiece without moving it. If the pivot axis 44 is elevated above the top of table 20, additional cutting planes on a workpiece can be achieved. Further, the axis of carriage mounting bar 48 can be rendered non-parallel to work table 20 by means of the manual screw shafts 57. Therefore, the carriage 62 traveling on the bar 48 will cause the blade 77 to travel along a path which is non-parallel to the table 20.

The machine according to the invention is characterized by simplicity of design, economy of manufacturing, convenience of use, and maximum versatility in accordance with the objectives stated herein previously.

Figure 8:
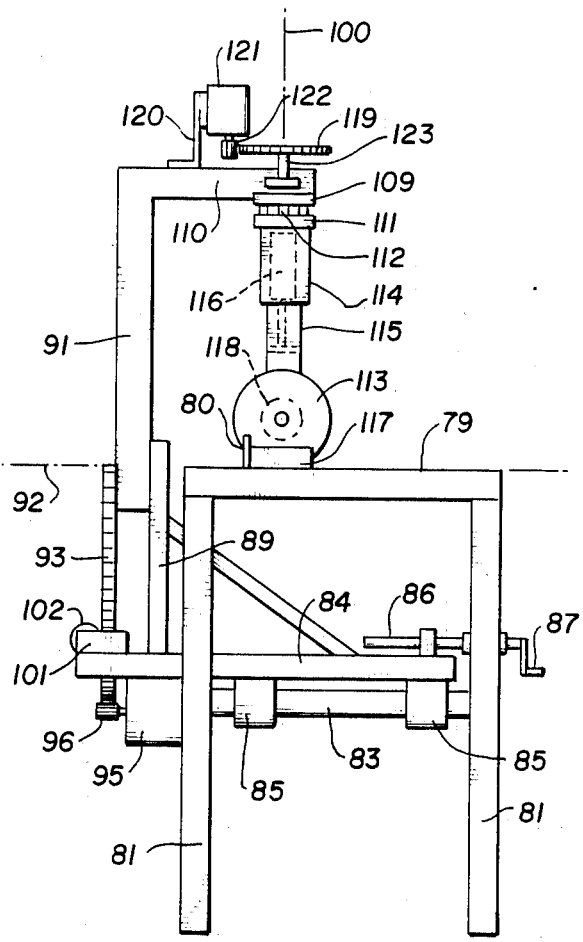
FIG. 8 is a side elevation of the second embodiment taken from the right-hand side of FIG. 7.
Figure 9:
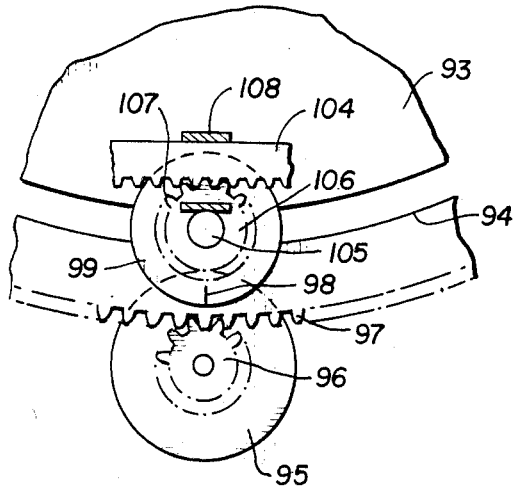
FIG. 9 is an enlarged fragmentary elevation, partly in section showing a protractor drive and lock arrangement.

A second embodiment of the invention is depicted in FIGS. 7 to 9 which differs primarily from the first embodiment in that the rectangular frame 30 and its turntable 26 are eliminated. In the second embodiment, a horizontal work table 79 has a workpiece fence 80 and is supported at a convenient elevation by legs 81 having longitudinal and transverse horizontal frame bars 82 and 83 at an elevation below the table top.

A pair of horizontally movable carriage members 84 are secured to sleeves 85 which are slidable in opposite directions on bars 83 under influence of a manual screw shaft 86 having a crank 87. Cross members 88 are fixed to each end of carriage members 84 to form a horizontal carriage frame. A vertical support 89 is fixedly attached to members 88. Braces 90 are attached to carriage members 84 and vertical support 89.

A column 91 is pivotally secured to the support 89 near the top of the latter on a horizontal pivot axis 92 which is perpendicular to workpiece fence 80. A protractor 93 having an arcuate slot 94 is attached fixedly to the column 91. A drive motor 95 is attached to cross member 88. A pinion gear 96 on the shaft of motor 95 meshes with gear teeth 97 on the periphery of protractor 93. The operation of motor 95 causes the protractor 93 to rotate around horizontal axis 92, with the result that column 91 moves from the perpendicular position shown in FIG. 7 to some angle away from the perpendicular indicated by pointer 98 on a washer 99.

Pivot axis 100 is perpendicular to the top of table 79 when the protractor 93 indicates 90°. Pivot axis 100 tilts as the protractor is turned by the motor 96.

A bracket 101 is fixed to cross member 88. A pneumatic cylinder 102 is attached to bracket 101 and its piston rod 103 is attached to a rack gear 104. A shaft 105 is attached to cross member 88 and is grooved to accept a key on the washer 99, which prevents the washer from turning. A shoulder on shaft 105 bears against protractor 93. The end portion of the shaft 105 extending beyond the protractor 93 is threaded to accept a nut 106. The exterior of nut 106 has teeth 107 meshing with the teeth of rack bar 104. A retainer 108 for rack bar 104 is attached to the washer 99, keeping the rack bar properly in mesh with the teeth of the nut 106.

Actuation of air cylinder 104 causes the nut 106 to be tightened or loosened, locking or freeing protractor 93 to be turned by the motor 95.

Slide base 109, FIG. 8, is pivotally mounted to a horizontal extension 110 of the column 91. An underlying slide base 111 is slidably engaged with slide base 109 for horizontal movement across the axis of extension 110. An air cylinder 112, equipped with limit stops, causes either the face side or motor side of a saw blade 113 to pivot around the vertical axis 100.

A tube 114 attached to slide base 111 receives another tube 115 within it telescopically. The lower tube 115 is extended and retracted vertically by a pneumatic cylinder 116, causing the saw blade 113 to reciprocate vertically for cutting a workpiece 117 on the top of table 79 and in engagement with the fence 80.

The tube 115 is restrained from rotating within the tube 115. A saw blade motor 118 is fixed to the tube 115 and powers the saw blade 113.

A shaft encoder 119 is attached to the slide base 109 and pivots in relationship thereto. A bracket 120 is attached to the column extension 110. A motor 121 is secured to the bracket 120 and operates a pinion gear 122, meshing with teeth on shaft encoder 119. A sensor 123 detects angular rotation caused by the motor 121 for digital control of the cutting angle of the saw blade 113.

It can now be seen that saw blade 113 in the second embodiment of the invention is capable of generally the same diverse movements as the saw blade 77 in the first embodiment of the invention, even though some of the movements may differ in degree from the first embodiment. Turning of the screw shaft 86 causes horizontal movement of carriage members 84 and shifting of the vertical pivot axis 100 relative to the stationary fence 80. The pivot axis 100 may be positioned in the plane of the fence 80 or at some selected position on the workpiece 117. The motor 95 allows cuts to be made on the workpiece 117 perpendicular to the top of table 79 or at some specified angle thereto. The motor 121 and sensor 123 form positioning means to cut the workpiece 117 at a selected angle relative to the fence 80.

In essence, the second embodiment of the invention can be compared to the first embodiment as follows. The horizontal bars 83 serve the same function or purpose as the bar 48. Shaft encoder 119 serves the purpose of the turntable 26. The elements do, however, operate in a different sequence. The sequence was changed because of the limited requirement for making compound angle cuts on dimensional lumber.

It is to be understood that the form of the invention herewith shown and described are to be taken as preferred examples of the same, and that various changes in the shape, size and arrangement of parts may be resorted to, without departing from the spirit of the invention or scope of the subjoined claims.

I claim:

1. A machine for making diverse cuts in workpieces comprising a table having a horizontal workpiece support surface and a workpiece fence, a powered rotary workpiece cutter above said support surface, carriage means for said cutter, means carrying the carriage means and cutter along a first horizontal path of movement parallel to the workpiece support surface, means to move the cutter on the carriage means on a second horizontal path of movement parallel to the workpiece support surface and perpendicular to said first horizontal path of movement, means connected with said table and with said carrying means for swinging said carrying means on an arcuate path around a horizontal axis lying in a plane defined by the workpiece support surface in opposite directions to adjust the angle of inclination of said rotary cutter with respect to the vertical and to lock the cutter in a chosen inclined position relative to said workpiece support surface, means to rotate said cutter around an axis perpendicular to said workpiece support surface, and means connected with said cutter and said carriage means to reciprocate the cutter on the last-named axis.

2. A machine as defined in claim 1, and said said carrying means comprising a frame rotatably supported on said table for rotation around a vertical axis and including a carriage mounting bar above and parallel to said workpiece support surface.

3. A machine as defined in claim 2, and said means for swinging said carrying means on an arcuate path around a horizontal axis lying in a plane defined by the workpiece support surface including a vertically disposed protractor member fixed to a part of the first-named means and having an arcuate slot to coact with a locking means for the protractor member.

4. A machine as defined in claim 3, and said means to reciprocate said cutter comprising a linear actuator means.

5. A machine as defined in claim 4, and the linear actuator means comprising an extendable and retractable cylinder-piston unit.

6. A machine for making diverse cuts in workpieces comprising a table having a horizontal workpiece support surface and a workpiece fence, a powered rotary workpiece cutter above said support surface, a carriage means for said cutter, means to move the carriage means and cutter on a first horizontal path of movement parallel to the workpiece support surface, means to move said cutter on the carriage means on a second horizontal path of movement parallel to the workpiece support surface and perpendicular to said first horizontal path of movement, means to rotate said cutter relative to said carriage means around a vertical axis of rotation perpendicular to said workpiece support surface, and means to swing the carriage means relative to the workpiece support surface around a horizontal axis with said cutter and to releasably lock the carriage means and cutter in a selected inclined position relative to the workpiece support surface.

7. A machine for making diverse cuts in workpieces as defined in claim 6, and said carriage means including a horizontal carriage guide means on said table at an elevation below said workpiece support surface, a horizontal portion of said carriage means guidingly engaged with said carriage guide means, power means connected with said horizontal portion to move it in opposite directions on said guide means, said carriage means including an upright support on said horizontal portion, and a column pivotally secured to the upright support and being swingable vertically around a horizontal axis, and said cutter and said means to rotate said cutter around a vertical axis of rotation being bodily mounted on said column.

8. A machine for making diverse cuts in workpieces as defined in claim 6, and means connected with the carriage means and cutter to reciprocate the cutter on an axis between the carriage means and said workpiece support surface.

9. A machine for making diverse cuts in workpieces as defined in claim 6, and said means to swing the carriage means around the horizontal axis and to releasably lock the carriage means comprising a protractor member on the carriage means swingable therewith, and a power actuator for the protractor member on said table at an elevation below the workpiece support surface.

10. A machine for making diverse cuts in workpieces as defined in claim 9, and the power actuator comprising a substantially horizontal linear actuator including a rack bar, a locking and release means for the protractor member including a gear element in mesh with the rack bar, and a driving motor for the protractor member including a pinion gear meshing with gear teeth on the protractor member.

11. A machine for making diverse cuts in workpieces comprising a table having a horizontal workpiece support surface and a workpiece fence, a turntable means on the table at an elevation below said workpiece support surface, a rectangular vertical carriage frame including a lower beam secured to the turntable means to rotate therewith in a horizontal plane, adjustable length vertical sides spaced outwardly from the workpiece support surface and an upper horizontal carriage mounting bar disposed at an elevation above the workpiece support surface, a carriage mounted for linear horizontal movement in opposite directions on the carriage mounting bar, a powered rotary cutter having a horizontal axis of rotation dependingly mounted on the carriage, means connected with the carriage to move the cutter horizontally at right angles to the axis of the carriage mounting bar, means to reciprocate the cutter vertically between the carriage and said workpiece support surface, and said vertical sides of the rectangular carriage frame including parts which are tiltable from the vertical on a horizontal axis adapted for positioning at the workpiece support surface, said parts carrying the carriage mounting bar.

12. A machine for making diverse cuts in workpieces as defined in claim 11, and gear teeth on and extending longitudinally of the carriage mounting bar, a motor secured to said carriage, and a pinion gear driven by the motor and having gear teeth in mesh with the gear teeth of the carriage mounting bar.

13. A machine for making diverse cuts in workpieces as defined in claim 11, and said means to reciprocate the cutter vertically comprising telescoping tube means interconnecting the carriage and powered rotary cutter, and an extensible and retractable vertical axis linear actuator connected with said telescoping tube means.

14. A machine for making diverse cuts in workpieces as defined in claim 11, and said means connected with the carriage to move the cutter horizontally at right angles to the axis of the carriage mounting bar comprising a pair of superposed slide base plates, and a horizontal axis screw shaft operable to shift one slide base plate horizontally relative to the other one.

15. A machine for making diverse cuts in workpieces as defined in claim 11, and the turntable means having a vertical axis of rotation and including a fixed spindle, a turntable member mounted rotatably on said spindle, a power means connected with the turntable member to rotate it in opposite directions, and coacting protractor means on the table and turntable member to indicate the angularity of the rectangular vertical carriage frame in a horizontal plane.

16. A machine for making diverse cuts in workpieces as defined in claim 11, and said adjustable length vertical sides of the rectangular carriage frame including vertical axis telescoping members, and screw shaft means coupled with said telescoping members to extend and retract them one relative to another.

17. A machine for making diverse cuts in workpieces as defined in claim 11, and a protractor device secured to one of said parts which is tiltable from the vertical on a horizontal axis.

18. A machine for making diverse cuts in workpieces as defined in claim 17, and means to lock said protractor device in a selected angular position in a vertical plane.

* * * * *